(No Model.)  L. D. HEATON.  2 Sheets—Sheet 1.
INSECT POISON DISTRIBUTER.
No. 395,272.  Patented Dec. 25, 1888.
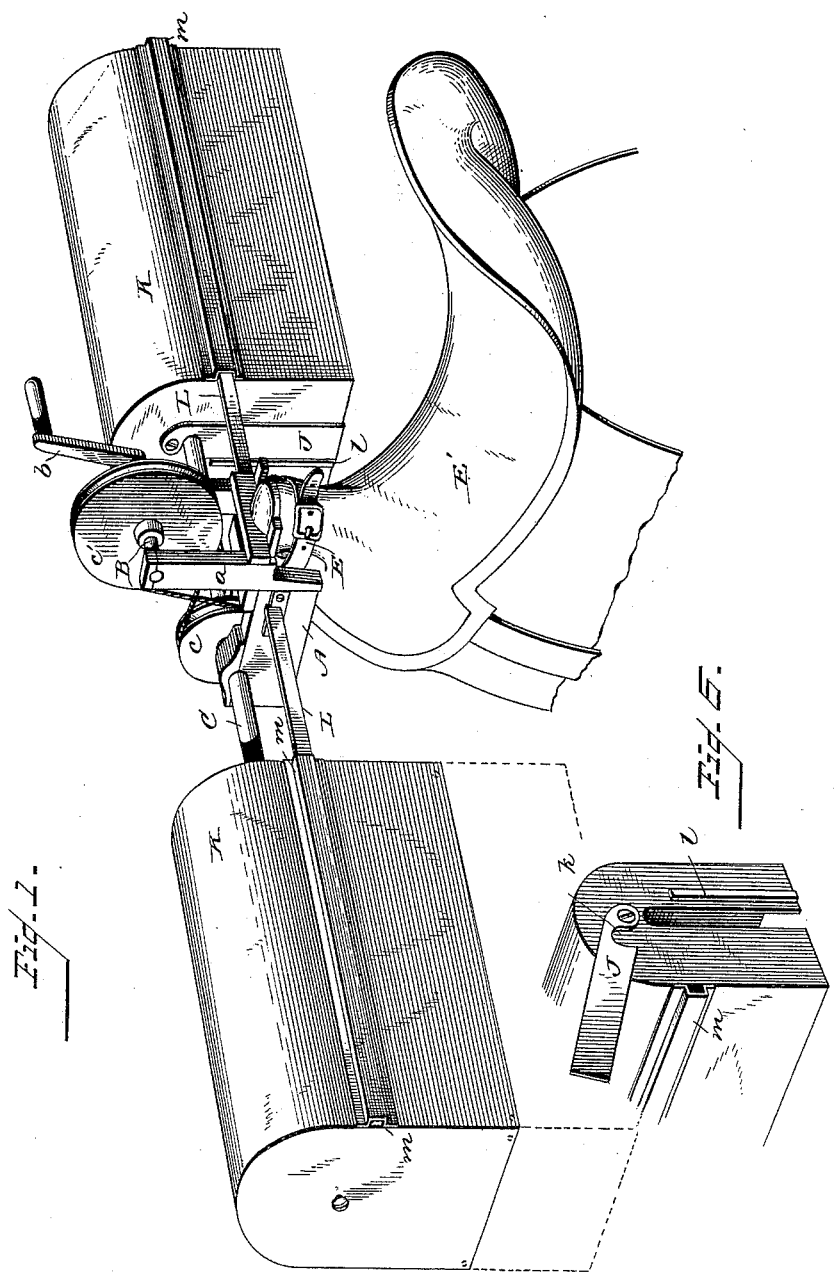

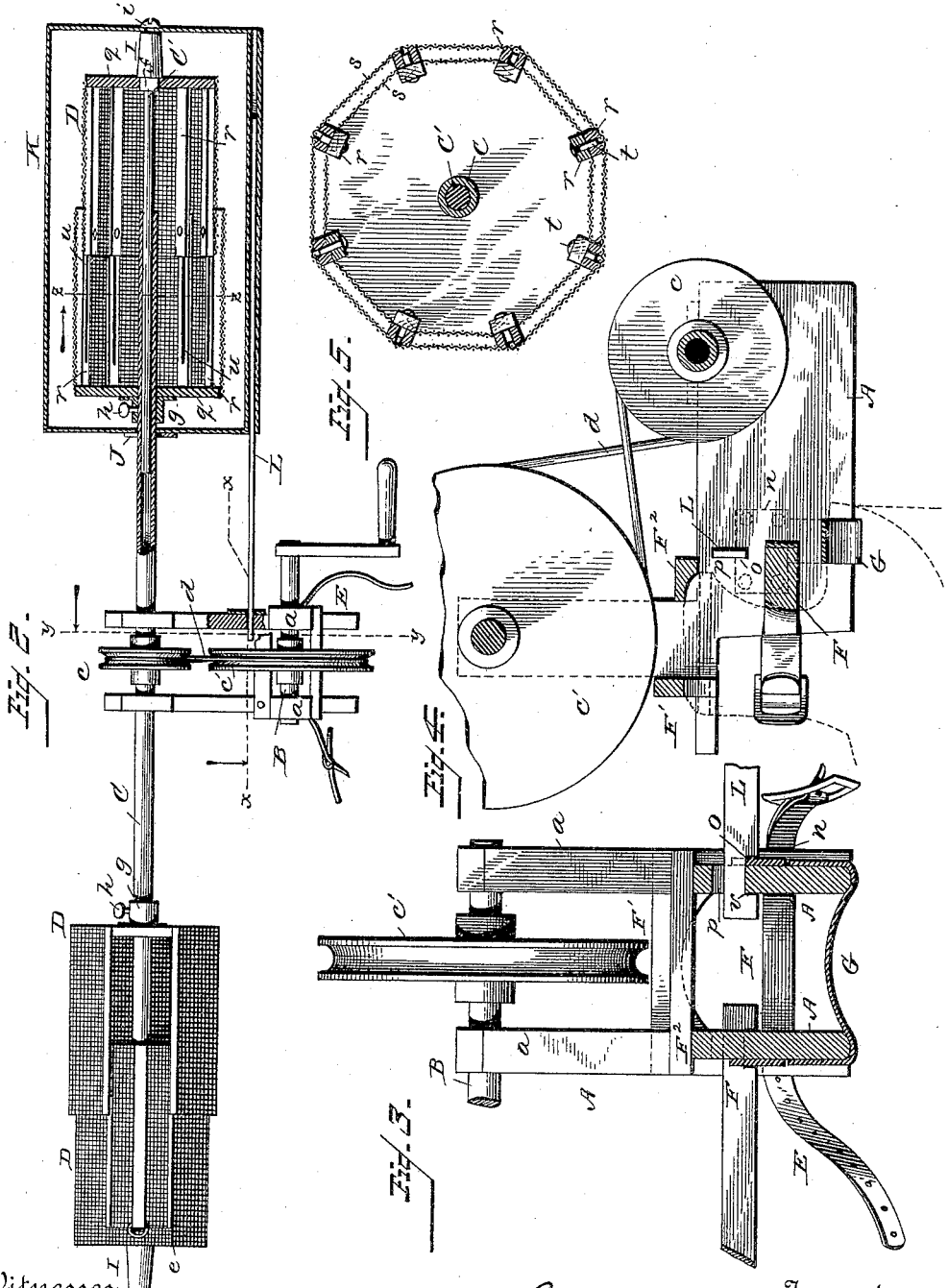

UNITED STATES PATENT OFFICE.

LORENZO D. HEATON, OF VICTORIA, TEXAS, ASSIGNOR OF ONE-HALF TO ARTHUR W. BURROUGHS, OF SAME PLACE.

INSECT-POISON DISTRIBUTER.

SPECIFICATION forming part of Letters Patent No. 395,272, dated December 25, 1888.

Application filed September 15, 1888. Serial No. 285,462. (No model.)

*To all whom it may concern:*

Be it known that I, LORENZO D. HEATON, a citizen of the United States, residing at Victoria, in the county of Victoria and State of Texas, have invented certain new and useful Improvements in Insect-Poison Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in devices for sprinkling potato-vines and the like with powder—such as paris-green—and has relation more particularly to that class of such devices wherein are employed revolving sifters, one at each end of a rotary shaft; and it has for its object to improve upon previous constructions of this character and to render the same more efficient in operation.

I provide for the ready adaptation of the device to rows of varying distances apart. I provide a shield applied, as hereinafter described, to protect the animal as well as the operator from the flying powder and to prevent waste of the same. I also provide ready access to the cylinders or sieves, as hereinafter described.

I improve in other details of construction, which will be more apparent from the following description when taken in connection with the drawings. The novelty therefore resides in the combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a perspective of a saddle with my invention attached thereto. Fig. 2 is a plan view of my device with a portion of the frame and one of the sieves and shields in longitudinal section and one sieve in full lines with the shield removed. Fig. 3 is a sectional view on the line $x$ of Fig. 2, looking in the direction of the arrow, of the frame with sieves and other parts broken away, and showing the position of the two braces and supporting-rods. Fig. 4 is a section on the line $y\,y$ of Fig. 2, with parts broken away and a portion of the saddle in dotted lines, showing how the frame fits thereto. Fig. 5 is a cross-section through one of the sieves on the line $z\,z$ of Fig. 2. Fig. 6 is a perspective of a portion of one of the shields.

In the drawings, A designates a suitable frame of any preferred material, from which frame rises the standards, $a$, in the upper ends of which is journaled the horizontal shaft B, provided with a suitable handle, $b$.

C is the main shaft, carrying the scatterers or sieves D D, and on this shaft, within the sides of the frame, is the pulley $c$. Both the pulley $c$ and the pulley $c'$ on the shaft B are preferably provided with a peripheral groove, in which runs the endless cord or belt $d$, crossed as shown, so that, motion being imparted to the shaft B, the shaft C, and consequently the scatterers or sieves, is given a rotary motion. The equivalent of the band and pulleys may be used instead of them.

The frame A is provided with a suitable strap, E, for securing the device to the horn of a saddle, said strap being provided with a buckle, as shown.

F is a stop-block secured to the frame A, and having its face made concave or curved, as shown, to fit the horn of the saddle, the strap passing around said block, and the pommel of the saddle being designed to slide into the space just over the said stop-block and below the blocks or pieces F' and F², the latter being concaved or cut away for the purpose, all as shown in Figs. 1, 3, and 4.

G designates a collar, preferably of iron, to adjust over the crown of the saddle, as shown in Fig. 4, to make it rigid and give it support.

D D are the scatterers or sieves, each formed of suitable heads, $q$, connected by longitudinal strips $r$, which serve to hold the said heads at a fixed distance apart, and also as a means for supporting the wire-gauze, $s$, or other perforated material, which forms the covering of the scatterers or sieves. It is obvious that these sieves may be constructed of a fixed length; but I prefer to construct them so that they will telescope. A suitable construction to that end is to form the sieves in cross-sections, so that one set of strips, *r*, will lap onto the other set, as shown in Figs. 2 and 5, and be provided with set-screws or bolts *t*, entering slots *u* in the other set of strips, so that one set of strips may be guided and adjusted along the other set, thus enabling the two sections to telescope to make the sieve longer or shorter, as may be desired. These sieves are preferably octagonal in cross-section, and the longitudinal strips *r* are extended within the sieves the distance of about one inch to form floats or dashers to agitate the material within the sieves, as will be readily understood and seen from reference to Figs. 2 and 5. Each sieve is provided with a sliding door, *e*, working in guides thereon and provided with a suitable knob or handle, by which it may be readily moved when necessary. These sieves are made adjustable on their shaft C, and this may be accomplished in various ways, although I prefer that shown, which consists in providing the spindle C' with an angular shoulder, *f*, fitting in an angular hole made in one head of the sieve, so that the sieve and spindle will turn together. This spindle will fit into the shaft C, made tubular for the purpose, so as to allow the sieve to adjust in or out. To the inner head of the sieve is connected a collar, *g*, through which a set-screw, *h*, passes and bears against the shaft C, so as to secure the parts together, in order that they may all turn together.

When it is desired to adjust the sieve closer together or farther apart to suit rows of plants of greater or less distance apart, it is only necessary to loosen the set-screws *h* and slide the sieves along their shaft to the desired point, and then by tightening the set-screws the sieves will be firmly held in their adjusted position.

In order to prevent waste of the powder used, and at the same time to protect the eyes of the person using the device, as well as the horse, I provide a shield, K, which may be varied to some extent in its shape, but the preferred form of which is shown in Figs. 1 and 6, in which the shield is pivoted to the shaft C in order to provide for the turning up of the said shield when desired to replenish the sieves. Each shield may be secured by having one end apertured so as to slip over the shaft C, while the other end is apertured and held up by a bolt or journal-pin, *i*, passed through the aperture and into a block or spool, I, provided at the end of spindle C'. The shields are thus free to be turned on the shaft and spindle when desired, but do not revolve with the shaft and sieves. They are open at their bottoms and are provided with pivoted doors J, having a recess, *k*, to pass around the shaft C, and when closed fit into guides or clasps *l*. They may, if desired, be provided with depending curtains or aprons of some fabric material, as indicated by dotted lines in Fig. 1.

The shields may be omitted without departing from the essence of the invention or detracting from the usefulness of the remaining parts.

L are brace or supporting rods fitting in sockets *m* on the sides of the shields and at the other ends removably secured to the frame A, preferably in the manner shown—that is, the plate *n*, secured to the said frame, has a notch, *o*, in it, to the rear of which, in the side of the frame, is a recess, *p*, into which the extended end of the brace-rod fits, the said end being notched, as shown, at *v*, and engaging the said plate, being thus made secure, yet easily removable. These rods form the support for the shield.

The frame constructed as described is easily applied to saddles of varying sizes and will fit closely to them, while at the same time it can be quickly applied and removed. It is also simple in construction, inexpensive to manufacture, and strong and durable in use.

Having described my invention and set forth its merits, what I claim is—

1. The combination, with a powder-duster, of its supporting-frame provided with the stop-block F, applied to the frame between its sides to bear against the horn of a saddle, and suitable means for securing it to the saddle, substantially as and for the purposes set forth.

2. The combination, with a powder-duster, of its supporting-frame provided with a stop-block applied to fit the horn of a saddle, and the collar G, secured to said frame and curved to rest upon the crown of the saddle, and means for securing the frame to the saddle, substantially as and for the purposes set forth.

3. The frame carrying the sieves and provided with the stop-block having a concave face to fit the curve of the horn of a saddle, and the cross-pieces above said stop-block having concave portions, said blocks forming a space to receive the pommel of a saddle, substantially as and for the purposes set forth.

4. The combination, with the frame formed with a recess to receive the horn of a saddle and provided with a strap for securing it to said horn, of the rotary shaft and the sieves adjustably secured to said shaft to be shifted lengthwise thereon, substantially as and for the purposes specified.

5. The combination, with the frame and the main tubular shaft journaled therein, of the spindle fitting in said tubular shaft, and the rotary sieves secured to said spindle and adjustable lengthwise on said shaft and provided with fastenings for holding them in their adjusted positions, substantially as described.

6. The combination, with the shaft and a support therefor, of the sieves secured to said shaft and formed in sections to telescope and provided on their interior with longitudinal strips divided in their length, so as to lap from one section onto the other when the sections are telescoped, substantially as and for the purposes set forth.

7. The combination, with the rotary sieves, of the shields extending around said sieves and extended below the bottom thereof and formed with open bottoms, substantially as described.

8. The combination, with the frame and shaft extending from it, of the sieves supported by said shaft, the shields extending around said sieves, and the rods secured at one end to said frame and at the other end to said shields to brace and assist in supporting the latter, substantially as and for the purposes set forth.

9. The combination, with the frame, its attached parts, and the main shaft, of the sieves on said shaft provided with dashers, the shields surrounding said sieves, the plate secured to the frame, and the brace-rods at one end fitting in sockets on the shields and at the other end formed with a notch engaging the plate on the frame, substantially as described.

In testimony whereof I affix my signature in presence of two witnesses.

LORENZO D. HEATON.

Witnesses:
GEO. C. HARDING,
C. W. NAU.